United States Patent [19]

Siccardi

[11] 4,369,030
[45] Jan. 18, 1983

[54] SYSTEM FOR CONTROLLED HEATING AND VENTILATING OF POULTRY HOUSES

[76] Inventor: Frank J. Siccardi, P.O. Box 242, Farmington, Ark. 72730

[21] Appl. No.: 266,638

[22] Filed: May 26, 1981

Related U.S. Application Data

[63] Continuation-in-part of Ser. No. 97,612, Nov. 27, 1979, Pat. No. 4,278,423.

[51] Int. Cl.³ .......................... F27B 9/40; F24H 1/00; F28F 27/00
[52] U.S. Cl. ........................................ 432/37; 236/49; 432/222
[58] Field of Search ...................... 432/37, 222; 236/49

[56] References Cited

U.S. PATENT DOCUMENTS

| | | | |
|---|---|---|---|
| 3,199,848 | 10/1965 | Harrison | 432/222 |
| 3,398,940 | 8/1968 | Kosarin | 432/222 |
| 4,011,041 | 3/1977 | Taylor | 432/222 |
| 4,278,423 | 7/1981 | Siccardi | 432/222 |

FOREIGN PATENT DOCUMENTS 1135852 12/1968 United Kingdom ................ 432/222

*Primary Examiner*—John J. Camby
*Attorney, Agent, or Firm*—Robert R. Keegan

[57] ABSTRACT

A heating-ventilating system including an air duct adapted to be installed in an exterior wall of a poultry house and having a fan mounted near the interior end of the duct and a fuel burner mounted in the duct upstream from said fan, the fuel burner being adapted to burn fuel efficiently in the high velocity air flow provided by the fan; an automatic damper upstream of the burner controlled by the pressure differential across the burner; an igniter including an electric spark generator and a starter-maintainer jet forward thereof for igniting the burner in response to an electrical signal; a controller for the fan which operates the fan alone in response to a warmer than desired temperature in the poultry house, which causes the fan to turn off at a desired temperature range in the poultry house, and which causes the fan to operate in conjunction with the fuel burner for lower than desired temperatures; and a curtain opening controller for automatic adjustment of curtains responsive to the fan burner controller.

14 Claims, 12 Drawing Figures

SYSTEM FOR CONTROLLED HEATING AND VENTILATING OF POULTRY HOUSES

This application is a continuation-in-part of my prior copending application, Ser. No. 97,612, filed Nov. 27, 1979, now U.S. Pat. No. 4,278,423, for "Heating and Ventilating System for Poultry Houses".

This invention relates to heating systems for poultry houses and in particular a heating-ventilating system which also provides introduction of fresh air into the poultry house, circulation of air within the poultry house and exfiltration (outward percolation) of air from the poultry house in a manner to provide optimum environmental conditions for the birds while making the maximum use of animal body heat in maintaining the desired poultry house temperature. The heating-ventilating system according to the present invention is intended for use in the warm, cool and cold months of the year and is not expected to be adequate for cooling poultry houses in hot summer months; conventional ventilating systems and the use of natural ventilation would be utilized during the season when extensive cooling would be required. It is also contemplated that the usual temperature warning alarms would be employed in conjunction with the heating-ventilating system of the invention.

A conventional poultry house structure is a long narrow structure about 35 feet wide and from about 250 to 600 feet long with screened openings along each side which can be closed with curtains or may be opened to increase ventilation. Customarily when heating of the poultry house was required the curtains would be closed and brooder stoves throughout the chicken house burning natural gas or LP gas provided added heat. A great deal of added heat may be required at the beginning of the growth cycle and as the birds gain body weight the heat provided by bird body heat provides most or all of the heat required to maintain the desired temperature in the house. The litter in the house is a source of heat which also increases through the course of the growing cycle.

In accordance with the present invention the number of brooder stoves is greatly reduced. Brooder stoves will be required only in a portion of the poultry house which is utilized in the beginning of the cycle. This portion of the house is closed off with a curtain during the initial weeks of the growing cycle. This technique is known as "partial house brooding", and the heating-ventilating system of the invention is particularly adapted to this technique.

There is normally one heating-ventilating unit in each poultry house, preferably at the end utilized for partial house brooding. In the partial house brooding portion of the cycle the brooder stoves are utilized but they are supplemented by the action of the heating-ventilating system, which circulates the air and prevents formation of a cold air zone near the floor. This also avoids much hotter air collecting at the ceiling, decreasing heat losses to the building exterior. Supplemental circulation is also provided by fans located near the peak of the roof and directed to produce air flow away from the burner-fan unit; the fans may be spaced at 100 to 200 foot intervals. The heating ventilating system also adds heat to the air drawn from the exterior as required.

According to the partial house brooding technique the birds are given access to a greater portion of the house as needed and eventually to the entire poultry house as their body weight increases. The heating-ventilating system of the invention continues to operate in essentially the same manner except that heat provided by bird body heat becomes more significant. The fan produces circulation of the air mass in the poultry house which is enhanced by the convection currents produced by animal body heat and by ceiling fans providing longitudinal air circulation. The system provides for re-circulation of air as well as introduction of exterior air. The introduction of exterior air produces a very slight positive pressure in the poultry house which prevents infiltration of outside air through crevices, gaps around curtains, etc.

By reversing the previously common infiltration situation the walls of the poultry house are kept much warmer and condensation on curtains, poultry house walls, and ceilings is substantially reduced. The overall moisture level in the house is also reduced due to the capacity of the warmed injected air for absorbing moisture which is removed from the house with exfiltration of the air. Substantially less ammonia is produced from the litter due to reduced moisture content (about 25% moisture).

The burner-fan unit is preferably constructed in the form of a cylindrical duct which is placed in an opening in the poultry house side wall. The interior end of the duct has a fan mounted therein which may be from about 24 inches to 30 inches in diameter. An open flame fuel burner is placed near the other end of the duct and heats the air passing through the duct directly without the necessity for a heat exchanger, thus greatly simplifying the construction and reducing the cost of the unit. The burner is designed to operate in the fan air flow to produce highly efficient combustion and the products of combustion are essentially water vapor and carbon dioxide and are nonpolluting. There is no heat stack loss. An automatic damper may be provided to control the air flow to the burner in response to the pressure differential across the burner further assuring efficiency of combustion. The burner is preferably supplied with an electronic ignition system and may also have a sustained pilot flame with an automatic flame-out cut off. As an optional feature the cables which open and close the curtains are provided with an automatic controller permitting up to about one foot of curtain opening adjustment in response to the fan-burner controller. An important part of the system is the control system which operates the fan, ignites the burner, supplies fuel to the main burner in two stages and controls curtain opening, all in a manner to properly control the environment in the poultry house as will be better explained in detail below.

The present invention differs from prior poultry houses heating and ventilating systems in that it heavily relies upon circulation of air and introduction of heated outside air to produce the desired environment. Open flame air heating units are in themselves known, of course, and have been used for agricultural purposes such as grain drying and animal housing, but such heaters are not known to have been employed for poultry houses environmental control in the manner described and claimed herein.

In addition to providing the above-described features and advantages it is an object of the present invention to provide an air injector, circulator, heater and curtain controller for a poultry house automatically controlled by temperature conditions and adjustable for climatic conditions to provide an optimum environment for birds in a poultry house during warm, cool and cold weather seasons.

It is another object of the present invention to provide a ducted fan open flame heating-ventilating unit with automatic dampers to compensate for different air density caused by temperature changes or the like, for a poultry house which is of simple and inexpensive construction and provides reliable, relatively maintenance-free operation.

It is still another object of the present invention to provide a poultry house environment during cold weather months wherein a portion of the poultry house, or the entire poultry house, is periodically provided with circulating air replenished from outside which is heated or temperature moderated by a combined heating-ventilating unit.

Other objects and advantages of the invention will be apparent from consideration of the following description in conjunction with the appended drawings in which.

Figure 1:
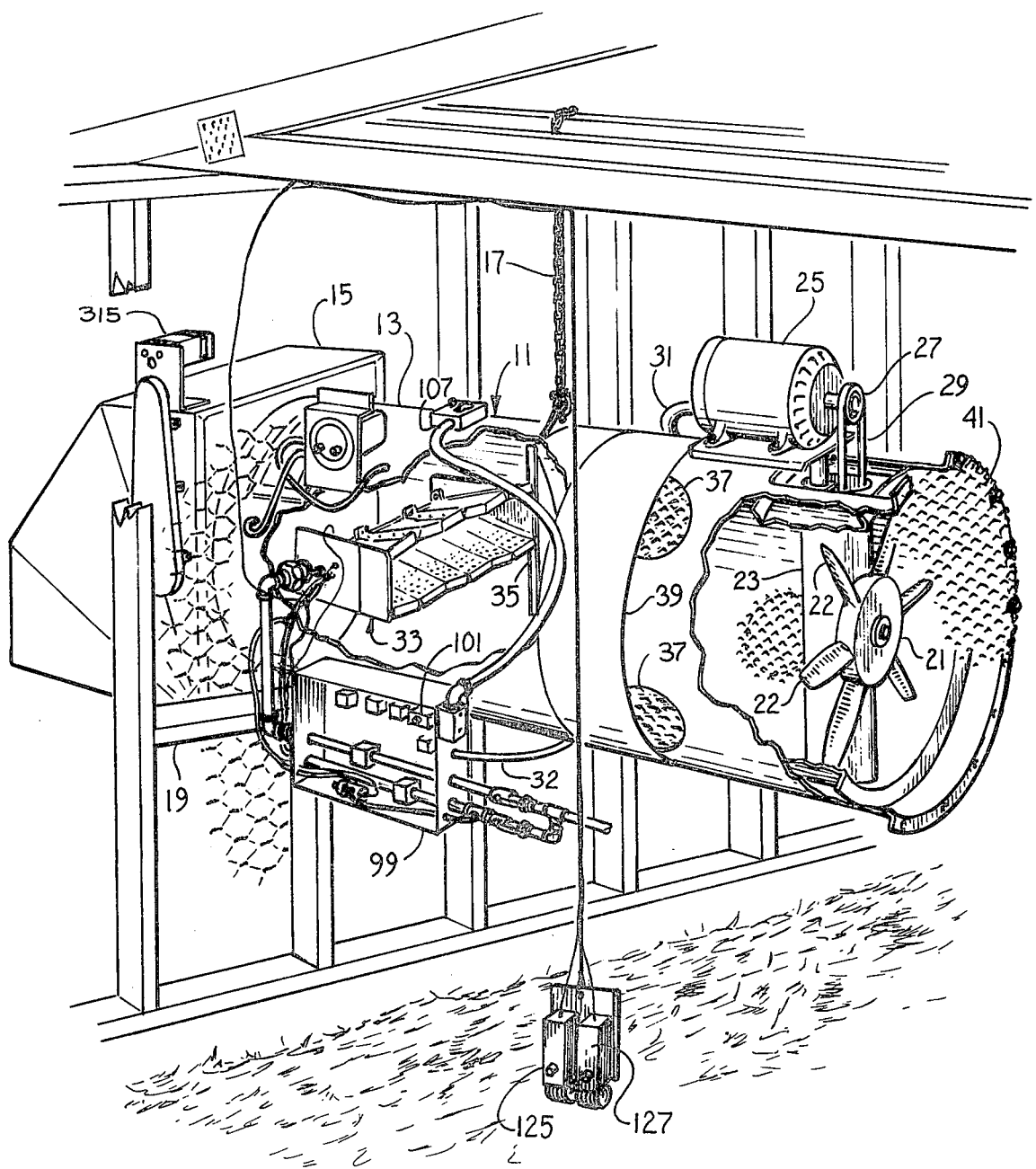
FIG. 1 is a perspective view partially broken away of a heating-ventilating unit according to the present invention.
Figure 12:
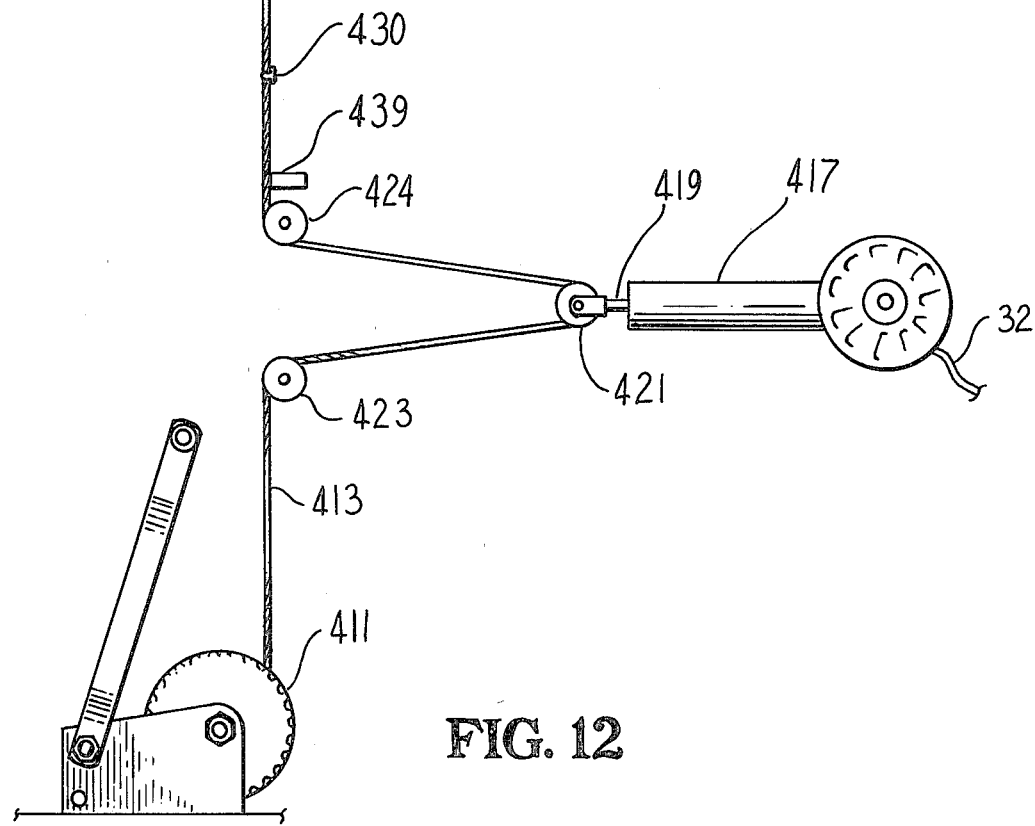

FIG. 12 is an elevational view of the curtain cable control and operating mechanism; and FIG. 1 shows a heating-ventilating unit 11 as it would be installed in a poultry house. The unit 11 includes a cylindrical steel duct 13 having a weather hood 15 secured to the outer end thereof. The unit 11 is preferably mounted several feet above the floor and may be supported in any suitable fashion such as by cable 17 attaching to a rafter of the chicken house. The duct 13 may also be secured to the frame 19 of the opening in the chicken house through which it projects.

Near the interior end of duct 13 there is mounted a bladed fan 21 which has blades 22 of a diameter only slightly less than the inside diameter of duct 13 thus producing an efficient ducted fan blower arrangement. Fan 21 serves to mix the air to produce a uniform air temperature as well as accelerating the air. Fan 21 is mounted on a cylindrical column 23 and is driven by fan motor 25 through a pulley and a belt 29 as will be more fully described with reference to FIG. 9.

An electrical control box 99 is secured to duct 13. Power cable 31 for motor 25 runs to control box 99 which is connected to power cables, usually for 230 volts, and contains relays, fuses and other electrical components later to be described. A cable 32 runs from control box 99 to curtain control motors (shown in FIGS. 12 and 13). An on-off switch 101 is provided on control box 99. Other components and controls may be located in the interior of control box 99. Temperature limit reset box 197 is located on top of duct 13. The electrical components and the electrical connections of control box 99 will be explained with respect to the electrical schematic block diagram of FIG. 10.

Duct 13 is broken away to show the interior which contains air heater 33 mounted between support plates 35 (only one of which is shown). Support plates 35 also serve as baffles to direct the air flow through the central portion of the duct 13 occupied by the air heater 33.

Figure 3:
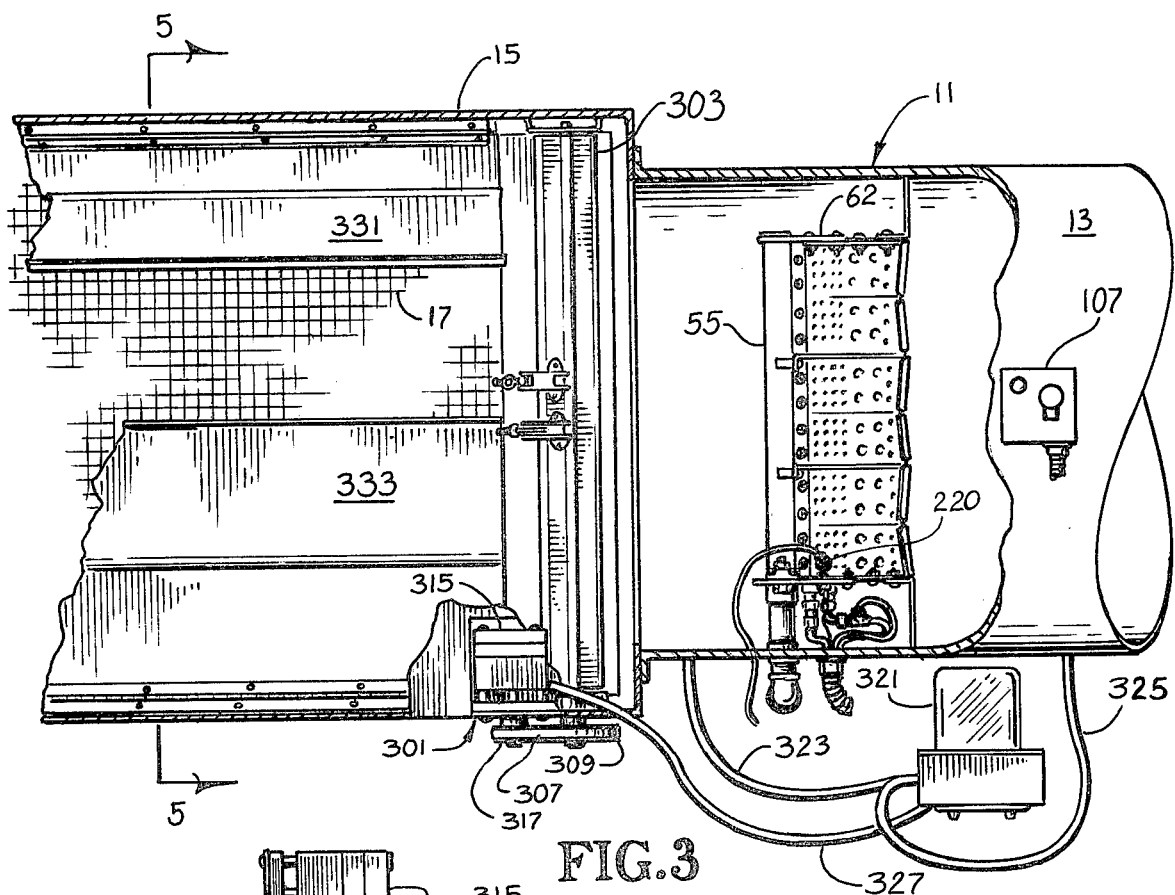
FIG. 3 is a fragmentary horizontal plane sectional view of the end of the heating-ventilating unit of FIG. 1.
Figure 4:
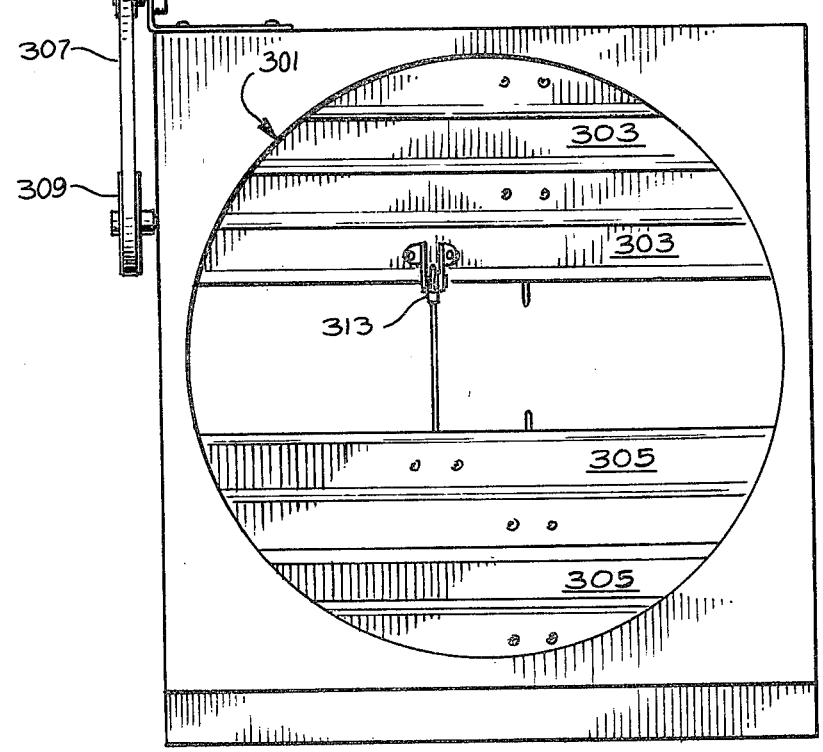
FIG. 4 is an enlarged fragmentary view of the duct inlet showing the power actuated damper louvers.
Figure 5:
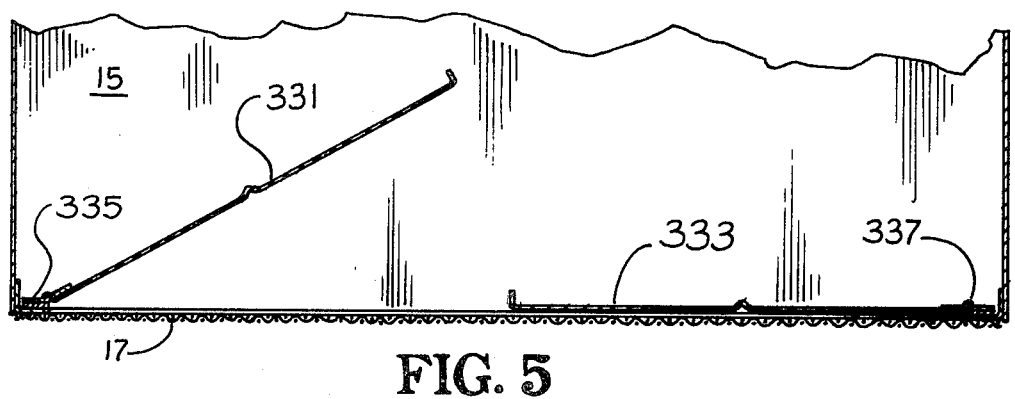
FIG. 5 is an enlarged sectional view showing the automatic closing claps.
Figure 8:
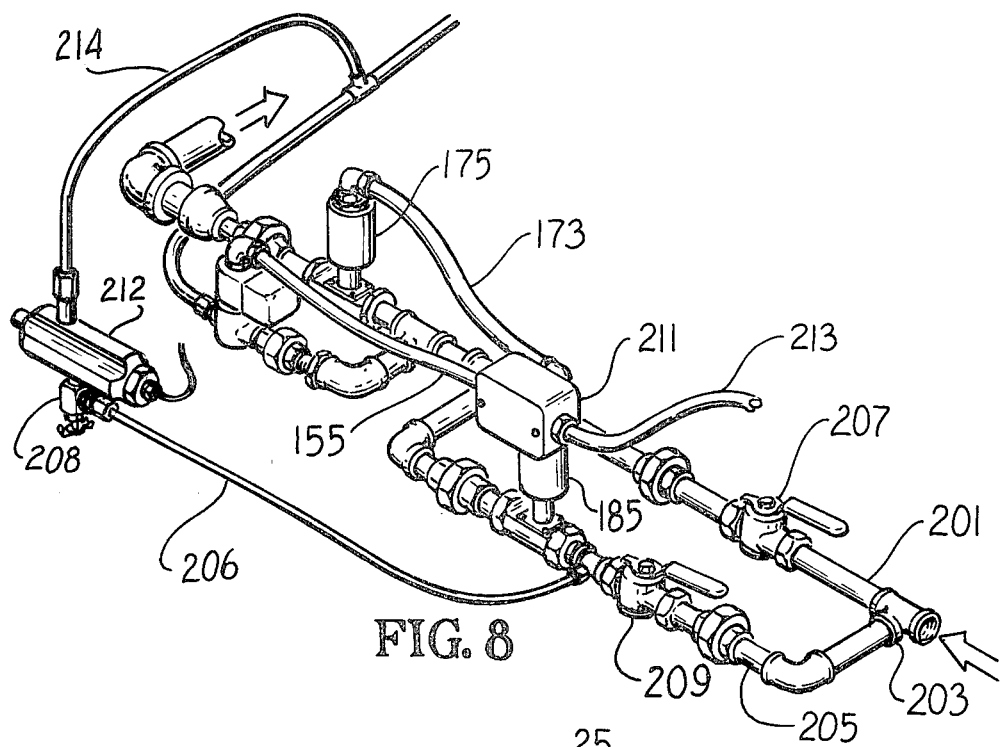
FIG. 8 is a perspective view of the pipes and control valves associated with the burner shown in FIG. 3.

Air heater 33 operates from natural gas or LP gas, the valves and connections for which are not shown in FIG. 1 but are shown in detail in FIG. 8. Damper louvers and automatic losing flaps upstream of air heater 33 are not shown in FIG. 1 but are shown in FIGS. 3, 4, and 5.

Figure 2:
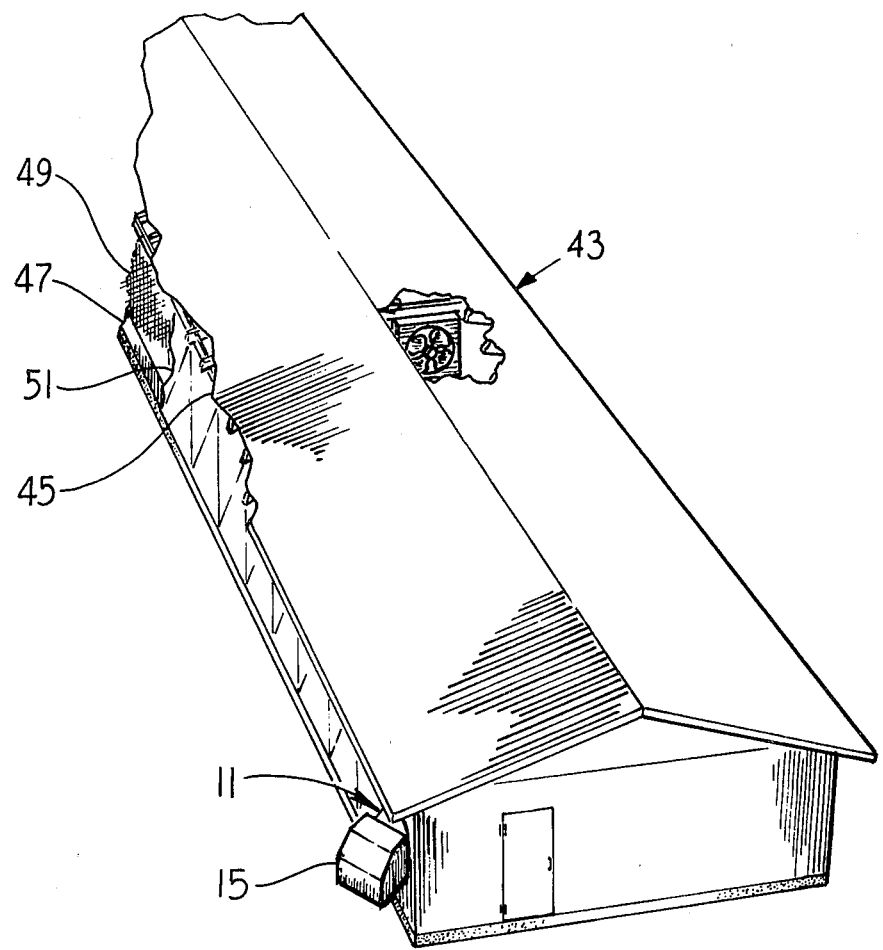
FIG. 2 is a perspective fragmentary view of a poultry house showing the placement of the heating-ventilating unit of FIG. 1 in the poultry house.

FIG. 2 shows an example of installation of the heating and ventilating unit in a poultry house 43. The poultry house 43 is customarily from 200 to 600 feet long and approximately 35 feet wide. The end having the heating-ventilating unit installed therein is shown with roof 45 broken away in FIG. 2. Circulating fans as shown at 46 may be placed at intervals of 100–200 feet; they are preferably placed near the peak of the roof and directed to cause air flow away from heating-ventilating unit 11. They may be independently thermostat-controlled. It may be noted that the heating-ventilating unit 11 is installed near the end of the poultry house 43 and is mounted at an angle to direct air from the blower toward the opposite end of the poultry house. It has been found that the circulation of air by the heater-ventilator unit arranged as shown in FIG. 2 is enhanced by convection currents created by the body heat of the birds. There is, of course, no reason why more than one unit in the same location could not be placed in a poultry house and controlled from the same or from a different control circuit; such additional equipment and expense is not usually necessary or justified.

It is desired that the unit 11 be placed near one end of the poultry house to facilitate the partial house brooding technique previously mentioned. In this technique a limited portion of the poultry house, such as 30–50% of its length, is screened off when first starting the birds through the growing cycle. Only this portion of the house is provided with brooder stoves in the utilization of the heating and ventilating system according to the invention. When the birds attain a greater body weight they will produce more body heat so that the brooder stoves will normally not be necessary and at the same time the birds will require a greater area to avoid overcrowding. At this point a large portion or the entire poultry house will be utilized by moving the interior curtain wall.

As may be observed from FIG. 2 the normal poultry house construction employs a large open area covered by screen along each side of the poultry house so that maximum use of natural ventilation can be obtained in summer months. The screened side openings 49 are covered by curtains 51, either wholly or partially, to control the amount of ventilation. In the most severely cold weather the curtains 51 will be closed to minimize loss of heat to the exterior of the house. When the curtains are closed they are still far from air tight, and it is an important advantage of the system of the invention that a moderate excess pressure is developed in the poultry house so that infiltration of air through the walls and curtains of the poultry house is minimized and on the contrary some air flow is forced from the interior to the exterior of the house. This keeps the walls and ceilings of the poultry house warmer than in the prior conventional heating systems and also it eliminates heavy condensation on walls and curtains which presented problems in past arrangements.

In the present system the air heated by the heating-ventilating system is capable of picking up moisture generated within the house and tends to carry it out of the house without condensing on curtains, walls or ceilings. Reduction of moisture reduces undesirable generation of ammonia or other vapors in the litter on the floor of the poultry house. The health of the chickens is better maintained without the excess moisture conditions prevalent in poultry houses utilizing former conventional methods of heating and ventilation.

FIG. 3 shows the air heater 33 and duct 13 in more detail. The flow of air through duct 13 is from left to right in FIG. 3. Openings 37 may be covered to any desired degree to adjust their effective opening area and hence control the amount of recirculation produced by fan 21. The larger the effective area of openings 37, the greater recirculation is provided and the less is the velocity of the air from left to right through the duct 13 past air heater 33. The air passing air heater 33 is drawn from the exterior of the poultry house through weather hood 15 which is provided with a screen 17 to prevent foreign objects being drawn into the duct 13. Heater 33 includes burner 55 having gas jets 57 spaced along its length. Burner 55 is not a Bunsen burner type provided with an air-gas mixer, but is rather arranged so that the high velocity air stream through duct 13 provides the combustion air for the heater 33.

Perforated baffle plates 59 are arranged in a V-shape as best seen in FIG. 1 and are designed to provide efficient combustion over a wide range of fuel injection rates and for the air velocities produced by fan 21. Typically diameters for duct 13 will be 24 inches, 27 inches, or 30 inches for poultry houses up to 250 feet, up to 400 feet, and up to 600 feet, respectively. Air velocity past burner 55 may typically range from 5000 to 15,000 cubic feet per minute. Except for the igniter and pilot, air heater 33 is a commercially available unit, the details of which do not form a part of the present invention.

The heating and ventilating system is preferably provided with a damper unit 301 located just upstream of the burner 55 as shown in FIG. 3. The purpose of the damper 301 is to control the air volume under changing conditions so that the air mass will remain substantially constant and good fuel efficiency and over-all operation will be obtained. The system shown here provides an automatic control for the dampers, but a less complicated and less expensive arrangement may employ manually adjustable dampers which can be set as desired in accordance with outside air temperature or other factors.

Damper unit 301 includes a plurality of louvers 303 and 305. Upper louvers 303 are hinged at the top while lower louvers 305 are hinged at the bottom so that when the louvers are partially open they tend to direct the air flow onto burner 55. Upper louvers 303 are linked together and pivot to an open or closed position as the lowest shutter 303 is rotated by the action of belt 307 on pulley 309 to which the lower one of louvers 303 is mechanically coupled. Belt 307 is driven by a reversible gear motor 315 through pulley 317. Lower louvers 305 are linked together and are operated through linkage 313 connected to the lower one of louvers 303. Linkage 313 causes louvers 305 to rotate in the opposite sense of the rotation of louvers 303. In other words, the lower louvers 305 pivot upward to a closed position while the upper louvers 303 pivot downward to a closed position. Gear motor 315 is controlled by a conventional pressure differential sensing unit 321. Pressure sensing unit 321 has sensing tubes 323 and 325 leading to openings in duct 13 upstream and downstream respectively from burner 55.

It has been found that if the pressure differential across burner 55 is maintained at or near a predetermined value the heating system will operate at near optimum conditions. The pressure differential across burner 55 is relatively low and for convenience the pressure values will be discussed in terms of inches of mercury.

Figure 11:
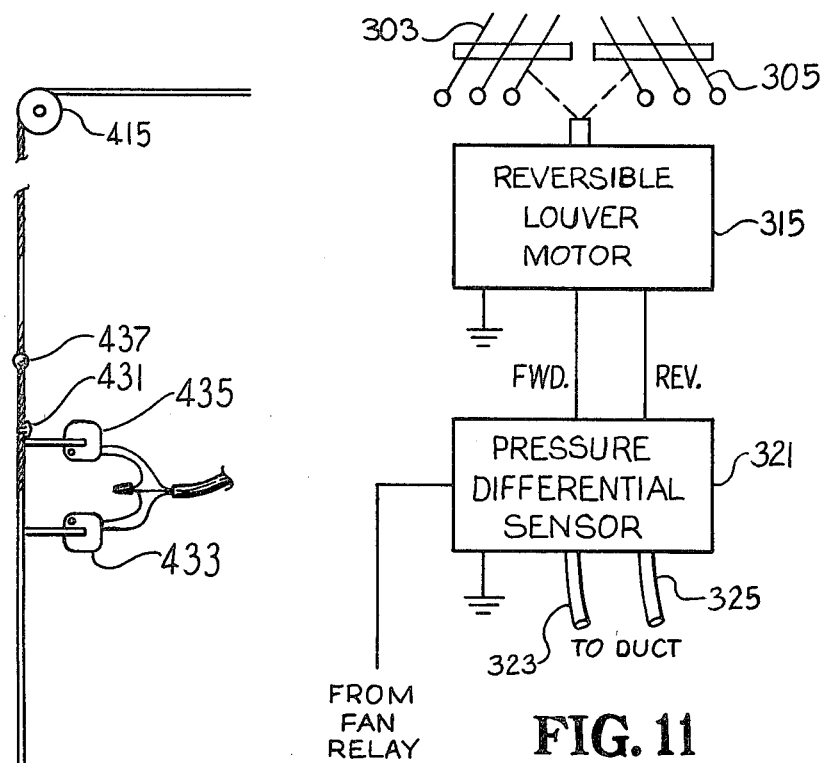
FIG. 11 is a schematic block diagram of the controls for the damper louvers.

For a particular size and design of heating and ventilating system, the air flow to give complete combustion and optimum operating conditions of burner 55 may be determined. That air flow will produce a particular pressure differential between the pressures sensed by tubes 323 and 324, respectively. Let us say a pressure of 0.2 inches. If the temperature of the air changes or the density of the air changes, or both change, the volume of air required to provide optimum operation will change, but the optimum operation will be at or near the point for which the pressure differential is 0.2 inches. Pressure sensor 321 is arranged to provide forward driving current or reverse driving current for gear motor 315 if the pressure differential departs from the desired pressure differential by plus or minus 0.5 inches. The schematic diagram for the louver control is shown in FIG. 11.

If the pressure differential as sensed by the pressure sensor 321 is below the desired value, motor 315 will be controlled to open louvers 303 and 305 increasing the air flow and increasing the pressure differential until the optimum value is reached. If the pressure differential is higher than desired, the motor 315 will be driven in the opposite direction to close louvers 303 and 305 until the appropriate adjustment has been made. Pressure sensor 321 is powered from fan relay 131 and operates only when the fan is operating.

In addition to keeping the air flow at the proper rate to operate burner 155 in an efficient manner, the automatic damper 301 has the desirable effect of reducing the amount of intake air when outside air temperature is low. This helps to avoid the problem of supplying a much greater amount of heat to raise the temperature of a greater mass of colder air when outside temperatures are low.

As shown in FIGS. 3 and 5, self-closing shutters 331 and 333 are provided to reduce the influx of cold air through the heating and ventilating system when the fan is not operating. Shutters 331 and 333 remain in the lower closed position as illustrated by shutter 333 in FIG. 5 under the influence of gravity while fan 21 is not operating. The negative pressure created by fan 21 causes shutters 331 and 333 to be lifted to a near vertical position as they pivot about their hinged attachments 335 and 337. Thus, shutters 331 and 333 present negligible resistance to air flow when open and substantially eliminate entry of cold exterior air when closed.

Figure 6:
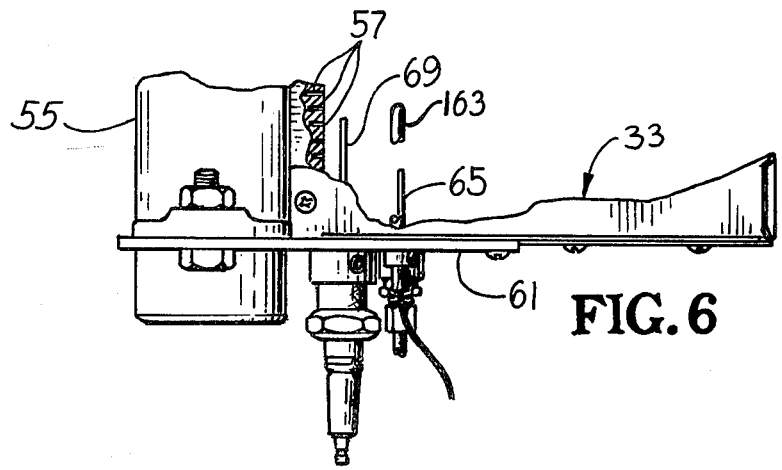
FIG. 6 is an enlarged fragmentary top plan view of a portion of the apparatus of FIG. 3 showing the spark generator for the burner.
Figure 7:
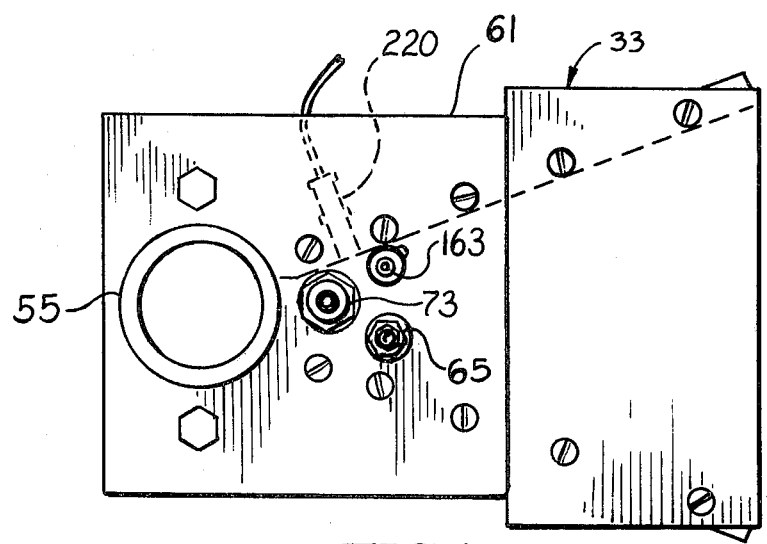
FIG. 7 is an elevational view of the apparatus of FIG. 6.

The igniter and flame sensor for air heater 33 are shown in enlarged detail in FIGS. 6 and 7. The ends of the wedge shaped volume between plates 59 are closed by end plates 61 and 62 secured to burner 55. End plate 61 has mounted therein an igniter jet 65 separately connected by tube 67 to the fuel supply as will later be explained. Upstream from jet 65 is a spark plug having an electrode 69 and grounded to burner 55. Above or slightly downstream is a flame sensor 163 which is a fast acting sensitive thermostat operating at approximately 700° F. Under the control of control circuits later to be described, jet 65 is supplied with fuel at the same time that the spark is produced between electrode 69 and the front of burner 55. The control circuit also assures that the fan is in operation. Gas from jet 65 is drawn backward across the spark gap between electrode 69 and burner 55 and is ignited. Backward flow of gas from jet 65 is believed due to turbulence produced by holes in plates 59. The flame from jet 65 passes over flame sensor 163 causing it to operate within a few seconds. The control circuits, as will later be explained, then cause burner 55 to be supplied with fuel which is ignited from jet 65 at which time the spark is no longer supplied to electrodes 69 and 71 and fuel jet 65 is cut off. As an optional feature the heating and ventilating system is provided with a standing pilot which may be used to provide extra insurance that ignition of the burner will always be achieved when called for.

FIG. 8 shows the fuel control portion of the system not shown in FIGS. 5, 6, and 7. Fuel enters the main fuel conduit 201 through a tee fitting 203. Tee 203 also connects to branch fuel conduit 205. Fuel in the main conduit 201 passes through main fuel metering valve 207, main valve 175 and into burner conduit 63. There is also a path for fuel through by-pass conduit 205, second stage fuel metering valve 209, second stage valve 185, and back to main fuel conduit. Main valve 175 and second stage valve 185 are electrical solenoid valves. A junction box 211 is provided for electrical cables 213, 155, and 173, providing the necessary electrical leads for the various valves. Ignite valve (also a solenoid valve) 159 is connected to receive fuel from the main fuel conduit 201 in advance of main valve 175 and fuel passing through ignite valve 159 is metered by ignition fuel valve 215 before passing to tube 67 and jet 65.

As best shown in FIG. 8, a standing pilot is provided which may be used in addition to the electrical ignition system to give further assurance that ignition will always be achieved. Except in cases of severe dampness or other adverse conditions, the electrical ignition system will usually be sufficient by itself. A copper tube 206 is connected into conduit 205 and connects through manual cut off valve 208 and flame-out safety valve 212 to copper tube 214 which joins tube 67 and thus independently supplies fuel to jet 65. When manual valve 208 is open start button 210 may be depressed to light jet 65 and when thermo-couple 220 controlling safety valve 212 is heated valve 212 will remain on unless the standing pilot at jet 65 is extinguished, in which case safety valve 212 will cut off the supply of gas. This is a conventional standing pilot system utilizing a conventional thermo-couple operated pilot safety valve 212. Either a natural gas supply or LP gas supply is connected into the control system of FIG. 8 as indicated by the arrow to tee fitting 203.

Figure 9:
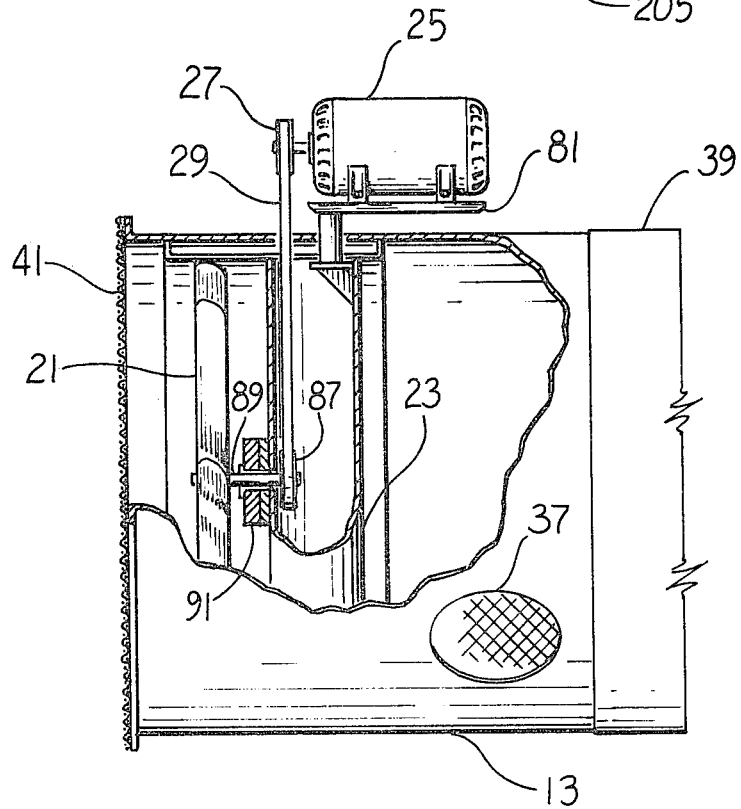
FIG. 9 is a fragmentary elevational view of the interior of the apparatus of FIG. 1 broken away to show the mounting of the fan therein.

FIG. 9 shows in enlarged detail the forward portion of the apparatus. Duct 13 has mounted therein a column 25 which may consist of a section of steel tube welded or otherwise secured in duct 13. Bearing 91 is secured to column 23 and supports shaft 89 of fan 21. A pulley 87 mounted on shaft 89 within column 23 is coupled by belt 29 to pulley 27 of electric motor; a second belt and double pulley may be used if desired. Protective screen 41 protects personnel and birds from injury by fan 21. Motor 25 may be mounted in any suitable fashion on duct 13 as by bracket 81. The specific manner of mounting and driving fan 21 may be as shown or of other conventional form and the present invention is not limited to the illustrated embodiment.

As previously mentioned the system is provided with screened openings 37 to permit recirculation of air in addition to induction of air from the exterior of the poultry house. Openings 37 may be closed in while or in part by the cylindrical shield 39 which slides to the left in FIG. 6 to close or partially close all openings 37. Moving shield 39 to close openings 37 will reduce the amount of recirculation. Shield 39 may, of course, be replaced by smaller individual adjustable closures over openings 37.

Figure 10:
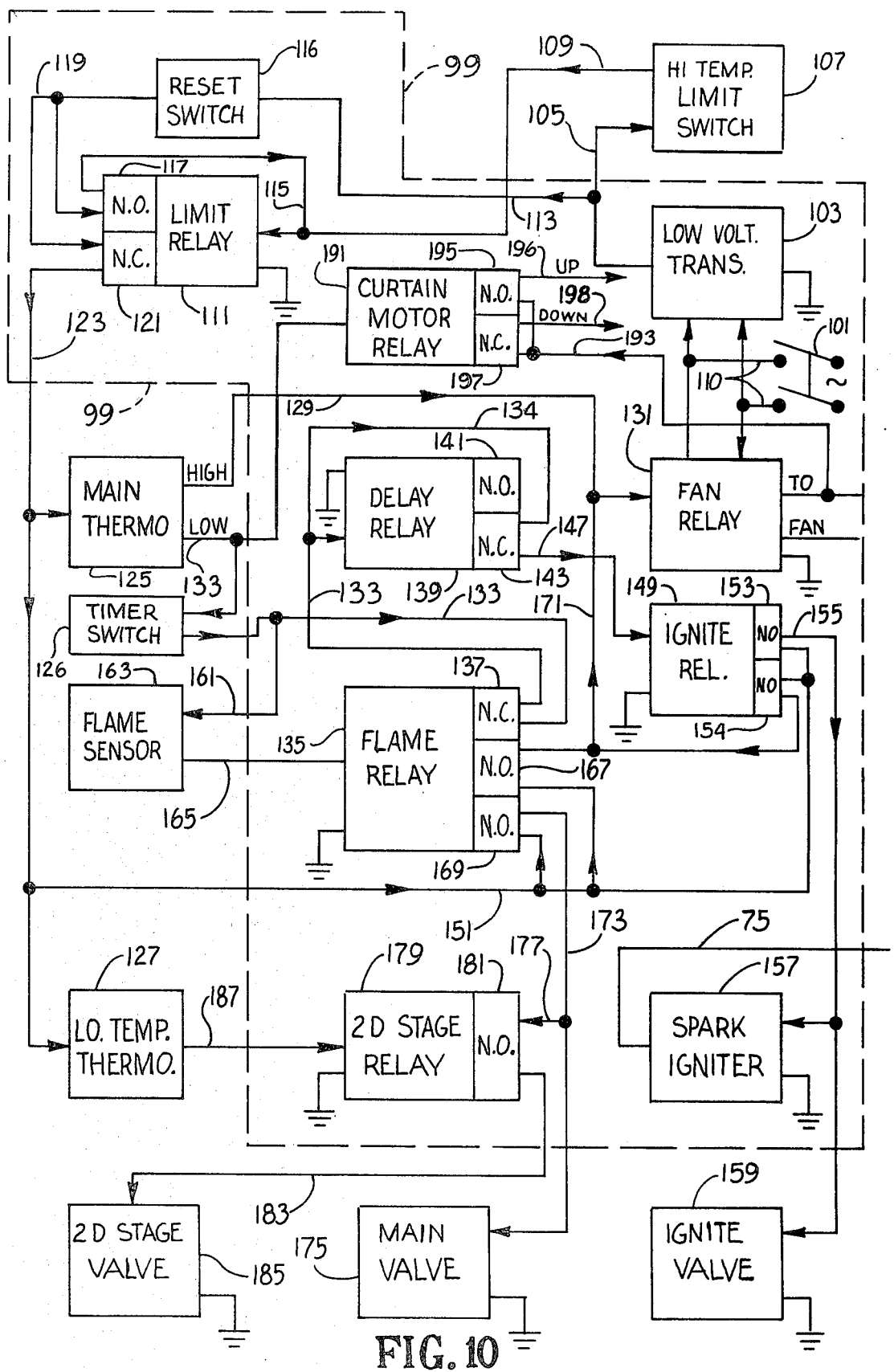
FIG. 10 is a schematic block diagram of the control circuit for the heating-ventilating unit of FIG. 1.

In FIG. 10 the control circuits for the heating and ventilating system are shown schematically. Main switch 101 is connected to the 230 volt electrical power supply (or other than 230 volt depending on requirements of the fan motor). Terminals 110 are connected to the primary of low voltage transformer 103 and also are connected to fan relay 131.

Low voltage transformer 103 provides a low voltage AC signal, of 28 volts for example, for use as a control signal and to operate relays, solenoid valves, etc. A lead 105 connects transformer 103 to one or more high temperature limit switches 107. Such switches will typically be placed in the vicinity of the gas burner and will have contacts which may be adjusted to close at a temperature of about 160° F. In normal operation with a high rate of air flow this temperature will not be reached. However, such temperature will be reached if the fan fails to operate due to a broken or slipping fanbelt or any other reason, thereby causing low air flow, high temperature and closure of the contacts of limit switch 107. A second high temperature limit switch may be placed upstream of the burner and connected in parallel with switch 107. This will assure high temperature cutoff even in presence of a back draft in the apparatus. Lead 109 connects switch 107 to limit relay 111 which will be caused to operate in response to a high temperature condition. Limit relay 111 has normally closed contacts 121 through which lead 119 connects to main low voltage lead 123. Operation of limit relay 111 thus cuts off the low voltage to lead 123 which disables the system as will later be seen. Equipment damage or a possible fire is thereby prevented should the air velocity drop to a dangerous level.

Lead 113 also connects through reset switch 116 normally open contacts 117 and lead 115 to the input of the coil of limit relay 111. Thus when limit relay 111 is operated it is latched by the signal through lead 115 even though the temperature at limit switch 107 drops and causes limit switch 107 to reopen. Limit relay 111 may be unlatched and the system reset by operating reset switch 116. Reset switch 116 is located in limit reset box 107 which may also be provided with an indicator light. This arrangement is a conventional temperature limit protection circuit and a standard commercially available circuit may be utilized for this portion of the system.

Lead 123 connects to the main thermostat 125 and also a low temperature thermostat 127. Main thermostat 125 is a dual temperature range thermostat with thermostatic switch contacts connecting lead 123 to a lead 129 in the high temperature range and to lead 133 in the low temperature range. By way of example the high temperature range may be above 83° F. and the low temperature range may be below 80° F. Preferably thermostat 125 is adjustable so each of these temperature ranges may be adjusted independently. It should be noted that a range from 80°-83° is provided where no heat or forced circulation is provided. (With the foregoing ranges for rising temperature, the ranges for falling temperature might be above 80° and below 77° due to normal lag of thermostatic switches.)

Timer switch 126 as shown in FIG. 10 is a conventional timer switch which has a relatively short cycle, for example one hour, and which permits the heating operation of the system to be disabled for any desired portion of each hour. Thus if timer switch 126 were set to 30 minutes per hour, the operation of the heating section of the heating and ventilating unit would be disabled for 30 minutes out of each hour. It has been found that this arrangement substantially increases the economy of operation of the heating and ventilating system without adversely affecting the environmental control provided. When the timer switch is being utilized (and preferably the system is provided with a by-pass switch so that the timer switch will not be in operation), the effect will be that the temperature in the poultry house may drop somewhat below the main thermostat setting during the time when the timer switch 126 is off. When the timer switch comes back on in 30 minutes or less, the heating-ventilating unit heating section will operate and will remain on somewhat longer to bring the main thermostat temperature to above the low temperature range. The time during which the heating section is operating and fuel is being consumed is reduced significantly with a very desirable effect on fuel economy.

High temperature lead 129 connects to the coil input of fan relay 131 so that the system fan will operate whenever the main thermostat senses a temperature in the high temperature range. Relay 131 may be a d.p.s.t. relay for connecting 230 V power to the fan motor. As shown in FIG. 10 it may also form part of the control circuit for the curtain motor described hereinafter.

Main thermostat 125 low temperature lead 133 connects through timer switch 126 and normally closed contacts 137 of flame relay 135 to the coil input of delay relay 139 and also through lead 134 and normally closed contacts 143 of delay relay 139 to lead 147 which connects to ignite relay 149.

When the low temperature contacts of the main thermostat 125 close, a signal from lead 123 is transmitted through main thermostat 125, timer switch 126, contacts 137, contact 143, and lead 147 to operate ignite relay 149. Ignite relay 149 operates spark igniter 157 and ignite valve 159 with power conducted through lead 151, contacts 153 and lead 155 and also operates fan relay 131 with power conducted through lead 151, contacts 154 and lead 171.

In the event that ignition is not achieved delay relay 139 will operate in about 90 seconds causing contact 143 to open and causing the release of ignite relay 149 and fan relay 131. Delay relay 139 will remain operated and the system will be shut down until the faulty ignition system can be corrected, at which time the system will be reset upon operation of switch 101. Normally open contacts 141 may be connected to a signal or alarm signifying ignition failure.

If igniter jet ignition is achieved in normal fashion in less than three seconds flame sensor 163 will operate in 20 to 30 seconds to close contacts connecting the low temperature signal through timer 126, lead 161 and lead 165 to operate flame relay 135. Contacts 167 and 169 will close, transmitting a signal from lead 151 through leads 171 and 173 to operate the fan relay 131 and main valve 175 respectively. Burner 55 will ignite from jet 65.

In the event that the standing pilot is on, the operation of the system will not be substantially different. The location of flame sensor 163 is such that it will operate when the fan 21 is operating (and there is a flame at jet 65. The operation of the standing pilot maintains the thermocouple 220 heated and valve 212 open but is not intended to activate flame sensor 163 in absence of air flow due to fan 21. Thus the operation of the flame sensor and the ignition circuits may be the same in the case of the use of the standing pilot and the case where it is not used as described above.

Operation of flame relay 135 causes contact 137 to open disabling delay relay 139 and disconnecting the signal to lead 147 which previously operated the ignite relay 149. Operation of fan relay 131 has been taken up from ignite relay contacts 154 by the signal through contacts 167, but spark igniter 157 is disabled and ignite valve 159 is closed. Ignite relay 149 may have a delayed release to assure burner ignition before jet 65 cuts off.

Main valve 175 will be maintained open causing the main burner to operate at the first stage level so long as the main thermostat 125 produces a low temperature signal (and limit switch 107 does not close).

Low temperature thermostat 127 may be located in the poultry house out of the airstream from the heating and ventilating unit and may be set to a temperature somewhat lower than the main thermostat such as 73° F., for example. When the interior temperature drops below this setting, low temperature thermostat 127 will provide a signal on lead 187 to second stage relay 179. Contact 181 will close so that the signal provided to main valve 175 is also provided over lead 177 and 183 to open second stage valve 185. Second stage valve 185 then provides additional fuel for the burner until the temperature thermostat 127 open. It may be noted that in any case second stage valve 185 only receives a signal causing it to open if main valve 175 is being operated by a signal on lead 173.

As an alternative arrangement low temperature thermostat 127 may be located to respond to outside temperature and be set at a temperature of about 20° or 30° F. This arrangement would cause the second stage valve 185 to operate together with the main valve 175 whenever the outside temperature was below the setting of low temperature thermostat 127 without the necessity for the temperature within the poultry house dropping lower than the low temperature setting of main thermostat 125. The second stage control may be omitted in climatic zones where it is unneeded, or one could alternatively provide a third stage as well as the second stage if desired for severely cold climates.

As illustrated the system provides air circulation without heating in response to a temperature above a predetermined value. By addition of a humidistat, unheated air circulation may be provided in response to high humidity levels, for example above 80%, in the poultry house. A humidity controlled switch may be connected between lead 123 and lead 129 to accomplish this purpose.

The system of FIG. 7 is described as an electromechanical relay control system, but it will be understood that equivalent solid state devices or circuits may be substituted for some or all of the relay devices in a manner well-known in the electrical art. The circuit may be converted to a DC control signal and semi-conductor diodes may be added in conformity with the functional arrows shown in FIG. 10 for the low voltage control signal. Appropriate fuses or circuit breakers will be provided for the system, but are omitted from FIG. 7 for simplicity.

FIG. 12 shows the automatic curtain control which is provided in the present heating and ventilating system. A conventional poultry house as shown in FIG. 2 has a large portion or all of its side walls provided with screened openings 49 covered by adjustable curtains 51. A common method of adjusting the curtains 51 involves a steel cable running along the top of the side wall of the poultry house having stringer cords attached at intervals of six to ten feet. The stringer cords are attached at the bottom end to the top of the curtain and each stringer cord is provided at the top with a pulley. Thus several hundred feet of curtain can be raised simultaneously by pulling the steel cable toward one end of the poultry house by a winch mechanism thereby pulling the stringer cords upward and the top of the curtain with them. According to the present invention a very slight modification in this curtain adjustment arrangement makes it possible to have automatic adjustment of the curtains, particularly during the cold and cool seasons of the year. FIG. 12 shows a conventional hand operated winch 411 which customarily is located in one end of the poultry house. Steel cable 413 runs over pulley 415 to the exterior of the poultry house where it operates to raise and lower the curtains as described above. The above-described portion of the apparatus is conventional and does not need to be altered to incorporate the automatic adjustment feature of the present invention. There will normally be at least two winches in a poultry house and preferably applicant's automatic adjustment apparatus will be provided for each winch and cable set.

The present invention provides an electric motor actuator 417, shown in FIG. 12 as a linear actuator, which may have a total motion of six to twelve inches for actuating rod 419. Any motor which may be arranged to produce reversible motion over a number of inches with high force may be employed in place of the screw-type linear actuator 417 illustrated. Preferably the motion of actuator 417 is quite slow, on the order of about one inch perminute. The end of actuator rod 419 has secured thereto a pulley 421 around which cable 413 is led to provide an offset in cable 413. Pulleys 423 and 424 maintain the original line of cable 413 for the remainder of the cable. It will be seen that the arrangement in FIG. 12 permits the normal raising and lowering of the curtains by use of the winch 411. However, the motor actuator 417 will also raise and lower the cable by a distance of approximately one foot in response to signals from the heating and ventilating fan control as previously described.

Cable 413 is provided with slidable clips 430 and 431, which operate with limit switches 433 and 435 to limit the range of motion of the curtains in response to the actuator 417 as may be desired.

For example, as the rod 419 is retracted by actuator 417 cable 413 moves downward carrying with it clip 431 until clip 431 reaches the operating arm on limit switch 435 which opens the contacts of switch 435 and stops the motor of actuator 417. A permanent stop 437 secured on cable 413 prevents clip 431 from being raised to a point where the curtains could be raised beyond their upper limit.

Clip 430 similarily controls the limit of downward motion of the curtains and a fixed block resting against cable 413 will slide clip 430 upward to prevent it running into pulley 424. As seen from FIG. 10 the curtain motor actuator is powered from the control circuit from curtain motor relay 195 whenever the fan 21 is operating. If heat is called for by main thermostat 125 relay 195 is operated and the motor direction is up to close the curtains. Otherwise the direction is down to open the curtains. Motor motion will continue until the fan 21 turns off or one of the limit switches 433, 435 opens.

The particular arrangement shown in FIG. 12 is simple and readily adaptable to common varieties of curtain adjustment mechanism, but it will be understood that it is shown for illustration only and any suitable mechanical arrangement for raising and lowering the curtains in response to controls from the heating and ventilating system may be utilized.

It will be understood that the components shown by way of illustration may generally be replaced by equivalent components performing the same function. For example other forms of fans or blowers could be used, but it is desirable that they have a capability of moving at least about 5,000 cubic feet per minute of air with low electric energy usage. Also the air heater of preferred form may be placed with a different form of heater, but it should be capable of efficiently burning about 100 cubic feet per hour of natural gas or an equivalent amount of other fuel to provide heat of at least 100,000 BTU per hour. The open flame burner illustrated converts over 90 percent of the fuel energy to heat and increases air temperature up to 85° F. Increase of air temperature will seldom reach 85° however. The unit is normally adjusted with fuel and air flow so the air discharge from the fan is at or below the desired house temperature.

As previously mentioned the placement of the heater-ventilator unit at one end of the poultry house is found to be very satisfactory, but the unit could be placed in the center of the poultry house to direct the air flow toward the ends of the house. The unit may be mounted at a right angle to the exterior wall rather than on a slant as shown, without diminishing the effectiveness of its operation. Also two units with separate or common control could be used in one poultry house and located together.

The system is shown applied to a conventional poultry house as found in the poultry producing region of Arkansas and surrounding states. The principles involved are applicable also to turkey houses and generally to houses for large numbers of warm blooded domestic animals. It should also be understood that automatic feeders and automatic watering equipment, together with temperature alarms and other equipment desirable for poultry house operation will be employed in conjunction with the heating-ventilating system of the present invention; such features are omitted from the illustrations for simplicity and clarity.

In addition to the variations and modification described or suggested above, numerous other variations and modifications to the invention will be apparent to those skilled in the art and accordingly the invention is not to be construed to be limited to the embodiment described in those variations and modifications shown or suggested, but is rather to be determined by reference to the appended claims.

What is claimed is:

1. A heating-ventilating system for a poultry house with adjustable curtains for ventilation comprising
   an air duct having an air intake and an exhaust opening,
   a fan mounted near the exhaust opening therein,
   a fuel burner mounted in said duct,
   a starter fuel jet therefor,
   a temperature sensor adapted to be placed in said poultry house out of the direct air flow from said fan,
   means for controlling said fuel burner to operate only in response to a low temperature condition of said temperature sensor,
   means for controlling said fan to operate in response to said temperature sensor,
   a flame sensor in proximity to said starter fuel jet,
   a valve for said fuel burner and control means for operating said valve responsive to said flame sensor,
   a motor for raising and lowering said adjustable curtains, and
   means for controlling said motor to raise said curtains when said burner is operative and to lower said curtains when said burner is inoperative and said fan is operative.

2. Apparatus as recited in claim 1 further including means for controlling said fan to operate in a poultry house temperature range higher than said low temperature condition.

3. Apparatus as recited in claim 2 wherein said high temperature range is spaced above said low temperature condition providing an intermediate temperature range in which said fan, as well as said fuel burner, is inoperative.

4. Apparatus as recited in claim 1 further including means for reducing fluctuations of the mass velocity of air through said duct past said burner including adjustable louvers disposed immediately upstream of said burner, a top one of said louvers being hinged in a manner to deflect air flow downward and a bottom one of said louvers being hinged to deflect air flow upward.

5. Apparatus as recited in claim 4 further including control means for adjusting said louvers in response to at least one sensor measuring a parameter associated with the air flow through said duct.

6. A heating-ventilating system for a poultry house with adjustable curtains for ventilation comprising
   an air duct,
   a fan mounted therein,
   a fuel burner mounted in said duct upstream from said fan,
   a starter fuel jet,
   a temperature sensor producing first and second signals for first and second non-contiguous temperature ranges adapted to be placed in said poultry house out of the direct air flow from said fan,
   means for controlling said fan to operate in response to either said first or second signal,
   means for controlling said burner to operate in response to said first signal only,
   a flame sensor in proximity to said starter fuel jet,
   a valve for said fuel burner and control means for opening said valve responsive to said flame sensor and said temperature sensor,
   a motor for raising and lowering said adjustable curtains, and
   means for controlling said motor to raise said curtains when said burner is operative and to lower said curtains when said burner is inoperative and said fan is operative.

7. Apparatus as recited in claim 6 wherein said starter fuel jet is on the downstream side of said burner and further including an electric ignitor positioned between said starter fuel jet and said burner.

8. Apparatus as recited in claim 6 further including means for reducing fluctuations of the mass velocity of air through said duct past said burner including adjustable louvers disposed immediately upstream of said burner, a top one of said louvers being hinged in a manner to deflect air flow downward and a bottom one of said louvers being hinged to deflect air flow upward.

9. A heating-ventilating system for a poultry house comprising
   an air duct having an air intake and an exhaust opening,
   a fan mounted near the exhaust opening therein,
   a fuel burner mounted in said duct upstream from said fan,
   means including a perforated baffle for directing the air flow at a controlled velocity and direction past said burner,
   a starter fuel jet adjacent said burner,
   a flame sensor in proximity to said starter fuel jet,
   a temperature sensor producing first and second signals for first and second temperature ranges and adapted to be placed in said poultry house out of the direct air flow from said fan,
   means for controlling said fan to operate in response to said flame sensor and said temperature sensor first signal,
   means for controlling said fan to operate in response to said temperature sensor second signal, and
   a valve for said fuel burner and control means for opening said valve responsive to said flame sensor and to said first signal from said temperature sensor.

10. Apparatus as recited in claim 9 further including means for reducing fluctuations of the mass velocity of air through said duct past said burner including adjustable louvers disposed immediately upstream of said burner, a top one of said louvers being hinged in a manner to deflect air flow downward and a bottom one of said louvers being hinged to deflect air flow upward.

11. Apparatus as recited in claim 9 further including a timer switch with a time cycle substantially less than one hour connected to said temperature sensor causing at least one of said first or second signals to be disabled for a portion of the time cycle of said timer switch.

12. A heating-ventilating system for a poultry house comprising
   an air duct having an air intake and an exhaust opening,
   a fan mounted near the exhaust opening therein,
   a fuel burner mounted in said duct upstream from said fan, means for reducing fluctations of the mass velocity of air through said duct past said burner including adjustable louvers disposed immediately upstream of said burner, a top one of said louvers being hinged in a manner to deflect air flow downward and a bottom one of said louvers being hinged to deflect air flow upward, control means for adjusting said louvers in response to at least one sensor measuring a parameter associated with the air flow through said duct, means including a perforated baffle for directing the air flow at a controlled velocity and direction past said burner, a starter fuel jet adjacent said burner, a flame sensor in proximity to said starter fuel jet, a temperature sensor producing first and second signals for first and second temperature ranges and adapted to be placed in said poultry house out of the direct air flow from said fan, means for controlling said fan to operate in response to said temperature sensor, and a valve for said fuel burner and control means for opening said valve responsive to said flame sensor and to said first signal from said temperature sensor.

13. A heating-ventilating system for a poultry house comprising an air duct having an air intake and an exhaust opening, a fan mounted near the exhaust opening therein, a fuel burner mounted in said duct upstream from said fan and approximately vertically centered therein, means including a perforated baffle for directing the air flow at a controlled velocity and direction past said burner, a starter fuel jet adjacent said burner, means for reducing fluctuations of the mass velocity of air through said duct past said burner including adjustable louvers disposed immediately upstream of said burner, a top one of said louvers being hinged in a manner to deflect air flow downward and a bottom one of said louvers being hinged to deflect air flow upward, a temperature sensor producing first and second signals for first and second temperature ranges in said poultry house, means for controlling said fan to operate in response to said temperature sensor, and a valve for said fuel burner and control means for opening said valve responsive to said second signals for said temperature sensor.

14. Apparatus as recited in claim 13 further including control means for adjusting said louvers in response to at least one sensor measuring a parameter associated with the air flow through said duct.

* * * * *